UNITED STATES PATENT OFFICE.

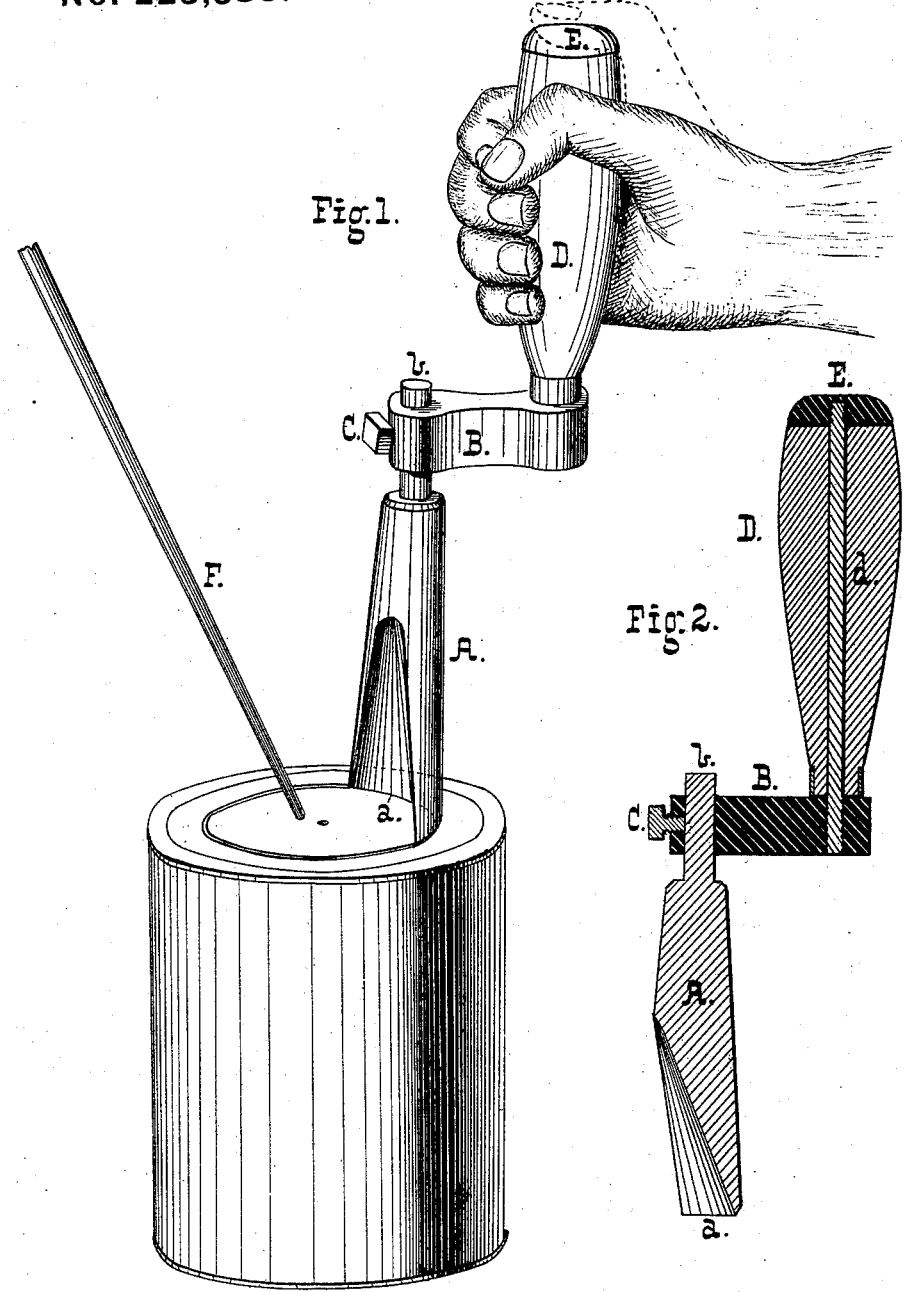

WILLIAM PAINTER, OF BALTIMORE, MARYLAND, ASSIGNOR OF ONE-HALF OF HIS RIGHT TO LOUIS R. KEIZER, OF SAME PLACE.

SOLDERING-TOOL.

SPECIFICATION forming part of Letters Patent No. 223,533, dated January 13, 1880.

Application filed October 29, 1879.

*To all whom it may concern:*

Be it known that I, WILLIAM PAINTER, of Baltimore city, State of Maryland, have invented certain new and useful Improvements in Soldering-Tools; and I hereby declare the same to be fully, clearly, and exactly described as follows, reference being had to the accompanying drawings, in which—

Figure 1 is a perspective view of the device, illustrating its mode of operation in capping a can; and Fig. 2 is a central sectional view of the device.

This invention relates to that class of soldering apparatus in use for capping or sealing provision-cans, and which has heretofore been constructed in one of two generic forms. In one, as shown in the patents of E. K. and J. M. Bruce, granted in 1866, and of J. L. Gray in 1867, the can to be sealed is mounted on a table arranged to revolve about a vertical axis, and the solder or sealing material is applied to the cover-groove, while the cap is retained in place by a suitable holder pending the revolution and sealing of the can. In the other class of soldering devices for the purpose named, the cap is held in place by means of a rod, which, being stepped in the center hole of the cap, serves as a pivot about which the iron is rotated, the solder being melted and spread in the groove by the rotating iron. Devices of this class are shown in the patents of Abel Barker, granted in 1870, Tillery and Ewalt in 1872, R. H. Smith in 1874, and others.

Both classes of soldering devices are open to certain objections, which it is the design of my invention to obviate.

The revolving-table machines are cumbrous and expensive and slow in operation. The center-rod irons, while not open to these objections, necessitate the retention of the rod, which is an integral part of the iron, upon the cap pending the setting of the solder after the retraction of the soldering-tool.

By dispensing entirely with a pivot-rod and depending upon means not a part of nor connected with the soldering-tool for holding the cap in place pending the setting of the solder, I utilize this interval of time in melting the solder on one can-cap while that on the preceding can is solidifying.

My invention consists in a hand soldering-tool having a soldering-edge curved to conform to the groove in the can-cover designed to receive the solder, and a handle located at one side of the axis of the soldering-tool in such manner that, while the rotation or revolution of the tool is dependent upon a rotary motion of the handle about the vertical axis of the can, it is determined and directed by the groove in the top or cover, with which the edge of the soldering-tool conforms.

My invention consists, further, in certain details of construction and combinations of parts, as hereinafter described.

In the accompanying drawings, A is the soldering-tool proper, constructed, by preference, of copper, having its lower edge beveled, as shown at *a*, so as to fit or enter the groove in the can-cover and curved to conform thereto, the soldering-edge constituting from about one-fourth to one-third of a circumference.

The shank *b* of the tool passes through a hole in the end of a transverse piece, B, in which it is secured by means of a set-screw, C. In the opposite end of the piece B is rigidly secured a rod, *d*, upon which the handle D, constructed of wood or other bad conductor of heat, is mounted and swivels freely.

The cap-piece E, made also of wood, which, by preference, is slightly larger in diameter than the end of the handle D, is rigidly secured to the rod *d*.

F is a rod, which is held in one hand of the operator, and retains the cap in place pending the operation of soldering.

In practice, the cap being laid in place on the can, solder is applied to the groove, and the iron is lifted from the fire-pot, where it has been heating. The operator places his thumb on the cap-piece E, as shown in dotted lines, whereby the rotation of the tool with reference to the handle is for the time being prevented and the adjustment of the soldering-edge in the groove facilitated. The cap being held in place by the rod F, which the operator holds in his other hand, the soldering-tool is made to travel around in the groove back and forth as the handle is moved about the axis of the can, the operator first removing his thumb from the cap-piece E, so as to admit of the rotation of the handle on the rod $d$.

The rod F is made to recede slightly in either direction as the edge of the tool approaches it, so that the soldering-edge may be made to pass completely around the groove and insure the proper melting of the solder.

The tool A is made removable from the transverse piece B for facility in renewing it as it is worn out.

By preference, the cans to be capped are placed in a row on a table or other suitable support, and the operator passes down the line and solders the cans in order.

While the device is more simple and less expensive than other devices heretofore used for the same purpose, its use results in an economy of time, arising from the fact that, as the holder F is not connected with the tool, the latter may be transferred from one can to the next as soon as the operation of soldering the former is complete, and the interval of time elapsing while the solder is solidifying is utilized in adjusting the tool upon the next can and melting the solder.

Moreover, it is neither necessary nor desirable that the holder be stepped in the center hole, as the latter is left free for the escape of gas or steam from the can, and the necessity for carefully adjusting the holder in the hole (incidental to the use of the center-rod irons) is obviated.

What I claim is—

1. In a hand soldering device for capping cans, the combination of a soldering-tool whose edge is curved to conform to the groove in the can-top and is the sole guide of the tool, with a handle located at one side of the axis of the tool, and practically parallel therewith, whereby the tool is caused to travel in the groove as the handle is rotated about the axis of the can, substantially as described.

2. The combination, in a hand soldering device for capping cans, of a tool having a soldering-edge conforming in shape to the groove in the can-top, the said edge constituting the sole guide of the tool, and a swiveling handle located at one side of the axis of the tool, and practically parallel therewith, whereby the latter is caused to travel in the groove as the handle is moved about the axis of the can, and the motion of the tool is determined and directed by the groove, substantially as described.

3. The combination, in a soldering device for capping cans, of a soldering-tool having its edge conforming to the groove in the can-top, a swiveling handle located at one side of the axis of the tool, and a cap-piece attached by rigid connections to the tool, whereby the rotation of the tool with reference to the handle may be prevented when desired, as and for the purpose set forth.

4. The combination, in a hand soldering device, of a tool having its edge conforming in shape to the groove in the can-top and guided solely thereby with a handle located at one side of the axis of the tool and a separate and independent holder for retaining the cap upon the can, as and for the purpose set forth.

5. The combination, in a soldering device, of a swiveling handle carrying a soldering-tool having a segmental soldering-edge adapted to maintain itself in the groove in the can-top as the handle is moved around, and a separate and independent holder for securing the cap, whereby the holder may be retained upon a can while its solder is solidifying and the iron be employed at the same time in melting the solder upon the next can, as and for the purpose set forth.

WILLIAM PAINTER.

Witnesses:
  R. D. WILLIAMS,
  JOHN C. GITTINGER.